United States Patent
Guenard (10) Patent No.: US 10,718,382 B2
(45) Date of Patent: Jul. 21, 2020

(54) COOLING SYSTEM FOR AXIAL MAGNETIC BEARING

(71) Applicant: Thermodyn SAS, Le Creusot (FR)

(72) Inventor: Denis Guillaume Guenard, Le Creusot (FR)

(73) Assignee: Thermodyn SAS, Le Creusot (FR)

(*) Notice: Subject to any disclaimer, the term of this patent is extended or adjusted under 35 U.S.C. 154(b) by 249 days.

(21) Appl. No.: 15/320,760

(22) PCT Filed: Jun. 25, 2015

(86) PCT No.: PCT/EP2015/064349
§ 371 (c)(1),
(2) Date: Dec. 21, 2016

(87) PCT Pub. No.: WO2015/197750
PCT Pub. Date: Dec. 30, 2015

(65) Prior Publication Data
US 2017/0152893 A1   Jun. 1, 2017

(30) Foreign Application Priority Data

Jun. 27, 2014   (FR) .................... 14 56060

(51) Int. Cl.
*F16C 37/00* (2006.01)
*F16C 32/04* (2006.01)
(Continued)

(52) U.S. Cl.
CPC .......... *F16C 37/005* (2013.01); *F01D 25/125* (2013.01); *F01D 25/16* (2013.01);
(Continued)

(58) Field of Classification Search
CPC .......... H02K 9/19; H02K 9/193; H02K 9/197; H02K 9/20; H02K 9/22; H02K 9/24; H02K 9/26; H02K 9/28
(Continued)

(56) References Cited

U.S. PATENT DOCUMENTS 6,729,858 B2   5/2004   Choi et al.
8,072,104 B2   12/2011   Korista
(Continued)

FOREIGN PATENT DOCUMENTS

CN   1466662 A   1/2004
CN   1218129 C   9/2005
(Continued)

OTHER PUBLICATIONS

Unofficial English Translation of French Office Action issued in connection with corresponding FR Application No. 1456060 dated Feb. 17, 2015.
(Continued)

*Primary Examiner* — Nguyen Tran
(74) *Attorney, Agent, or Firm* — Mintz Levin Cohn Ferris Glovsky and Popeo, P.C.

(57) ABSTRACT

Embodiments of the present invention provide a magnetic bearing system comprising an axial bearing rotating flywheel arranged so as to magnetically interact with at least one fixed axial stop. The system includes a cooling fluid path configured so as to send the flow to the flywheel in a direction of flow being in a substantially radial plane relative to the axis of rotation of the flywheel.

10 Claims, 4 Drawing Sheets

(51) Int. Cl.
*F01D 25/12* (2006.01)
*F01D 25/16* (2006.01)
*F04D 29/058* (2006.01)
*F04D 29/58* (2006.01)
*H02K 7/02* (2006.01)
*H02K 7/09* (2006.01)
*H02K 9/00* (2006.01)

(52) U.S. Cl.
CPC ......... *F04D 29/058* (2013.01); *F04D 29/582* (2013.01); *F16C 32/0476* (2013.01); *H02K 7/02* (2013.01); *H02K 7/09* (2013.01); *H02K 9/005* (2013.01); *F05D 2240/51* (2013.01); *F16C 2360/23* (2013.01)

(58) Field of Classification Search
USPC ....... 384/317, 321, 322, 368, 369, 370, 371, 384/372, 373; 310/52–65, 74, 103–110
See application file for complete search history.

(56) References Cited

U.S. PATENT DOCUMENTS

2010/0074737 A1 3/2010 Kuehn
2015/0054366 A1* 2/2015 Boffo ................. H02K 7/09
310/74
2016/0254066 A1* 9/2016 Mauvais ............. F04D 7/08
417/423.3

FOREIGN PATENT DOCUMENTS

| CN | 1796794 A | 7/2006 |
|---|---|---|
| EP | 2557278 A2 | 2/2013 |
| GB | 2357321 A | 6/2001 |
| JP | 2008283813 A | 11/2008 |
| SU | 1139911 A1 | 2/1985 |

OTHER PUBLICATIONS

PCT Search Report and Written Opinion issued in connection with corresponding PCT Application No. PCT/EP2015/064349 dated Sep. 18, 2015.

Machine Translation and First Office Action and Search issued in connection with corresponding CN Application No. 201580035145.8 dated Jul. 18, 2018.

Office action and search report issued in connection with corresponding RU Application No. 2016149079 dated Nov. 27, 2018.

* cited by examiner

//COOLING SYSTEM FOR AXIAL MAGNETIC BEARING

BACKGROUND

Embodiments of the present invention relate to fluid cooled bearing systems, and particularly systems comprising an axial magnetic bearing cooled by a fluid flow.

Typically, in such a bearing, a fluid flow, for example a gas stream, is injected into one or more air gaps between a rotating flywheel of the axial bearing, and one or more fixed abutments of the axial bearing. The gas stream must be sufficient to evacuate both the calories generated by the magnetic induction phenomena, and the calories generated by the fluid viscous frictions at the air gap. Ventilation loss designates the latter type of loss.

When the bearing system is part of a rotating machine such as a turbine or a compressor, the high flow rates of gas necessary for cooling sometimes lead to establish a cooling fluid circuit configured to cool not only the bearing system, but also to cool other components of the machine.

This cooling circuit can be arranged internally to the machine, using, for example, the main fluid flowing through the rotating machine and the pressure differences existing naturally in this machine, or can be arranged separately by means of a dedicated cooling circuit possibly using another cooling fluid (for example, but not exclusively, air) and a generating system of dedicated fluid flow.

In all cases, the cooling flow rate directly generates an economic loss, either because of a yield loss of the turbomachine (internal system), or because of the cost linked to the investment and use of the external cooling system.

To reduce the cost of cooling, cooling fluid flow should be reduced while continuing to provide the same operating temperatures of the components of the bearing or of the bearing system.

The embodiments aim to propose a bearing, or a bearing system, cooled by a fluid circulation system which allows effective cooling of the bearing, i.e. which allows removing the calories generated by the magnetic, electrical, and ventilation losses, while using only a reduced flow rate of cooling fluid.

The embodiments propose to reduce the need for cooling by reducing ventilation losses.

Generally, the ventilation loss corresponds to the energy transferred by the rotating flywheel to the cooling fluid. This energy can be positive, negative or zero.

If the local speed of the flywheel is greater than the fluid speed, the flywheel causes the fluid to rotate. The fluid is heated. The greater is the difference in speed between the fluid and the flywheel, the more important the energy loss is.

If the local fluid speed is identical to that of the flywheel, there is no friction and no loss by ventilation.

If the fluid speed is greater than, and in the same direction as, the speed of the flywheel, the fluid drives the flywheel by transferring energy to it.

This suggests that the loss of ventilation can be limited or canceled by reducing the existing speed difference at any point between the stop wheel and the cooling fluid.

The general principle of embodiments of the invention is to inject the cooling fluid at high speed in the direction of rotation (tangential direction) of the stop in order to minimize friction losses. High speed means a tangential speed of fluid of 50% to 150% of the tangential speed of the stop at the point of the stop that passes in front of the injection point.

Simple considerations of conservation of angular momentum of the injected fluid show in particular that, for a given injection speed, it is more effective, for reducing the friction loss, to inject the fluid at the periphery of the flywheel rather than towards the internal diameter.

BRIEF DESCRIPTION

To this end, embodiments of the invention provide a magnetic bearing system comprising a rotating flywheel of axial bearing arranged so as to magnetically interact with at least one fixed axial stop.

The system includes a cooling fluid path arranged so as to send the cooling fluid flow to the flywheel in a flow direction in a substantially radial plane relative to the axis of rotation of the flywheel.

The fluid is injected into the bearing system so that the fluid flows along one or more open sides of the flywheel, in an axial air gap between the flywheel and one or more axial stops.

According to an embodiment, the fluid is sent toward a peripheral circumferential surface of the flywheel. According to a variant embodiment, the fluid is sent toward the peripheral circumferential surface so as to impact thereof. According to another variant embodiment, the fluid is sent toward the peripheral circumferential surface so that the stream flows along a substantially radial surface contiguous to the peripheral circumferential surface.

Peripheral circumferential surface means a surface limiting the radial extent of the flywheel. This surface may be a portion of a cylindrical surface of revolution, may be a portion of a cylindrical surface produced by a non-circular profile, or may be a portion of non-cylindrical surface, for example a portion of toroidal surface on which blades are assembled.

In the present description, radial surface means a planar surface generated by straight lines perpendicular to the flywheel axis and all passing through the same point of the axis. Axial direction means a direction of a straight line parallel to the axis. Axial surface means a portion of a surface generated by straight lines which are all parallel to the axis. Such a surface is, in fact, a cylindrical surface or a portion of a cylindrical surface.

It is possible to consider variant embodiments in which the fluid flow is injected, for example through a stop, in the air gap between the flywheel and the stop, without sweeping the most peripheral portion of the flywheel. The injection direction of the flow is then configured to be substantially in the plane of the air gap. For example, the injection direction of the flow forms an angle with the axis of the flywheel which is between 70° and 110°, and more particularly, between 80° and 100°.

According to an embodiment, the cooling flow is sent to the flywheel so that, in at least one impact point of the flow on the flywheel, the speed component of the flow which is perpendicular to the radial direction, greater than or equal to half the linear speed of rotation of the flywheel at this impact point, and more particularly, greater than or equal to 0.7 times the linear speed of rotation of the flywheel at this impact point. According to an embodiment, especially when the flow is sent on a peripheral circumferential surface of the flywheel, the tangential speed of the fluid flow (i.e. the speed perpendicular to the radial direction) is greater than the linear speed of rotation at the impact point, so as, not only to limit the fluid friction caused by the cooling flow, but also to provide rotating mechanical energy to the flywheel. Point of impact means here a meeting point between the path of the fluid and the surface of the flywheel. The tangential speed of the fluid flow may be less than the local speed of the flywheel rotation, particularly in the case where the flow of fluid is injected by centering it on the air gap between the flywheel and the stop. The direction of the fluid flow can be imposed by directing a pipe or bores to move the fluid towards the flywheel, for example through a flow guiding piece. The total desired speed of the fluid flow may be imposed in particular by the section of pipes or by bores of fluid intake, by the length of the bores, and by the fluid pressure imposed on the input of these bores or pipes.

In an embodiment, the magnetic bearing system comprises at least one fluid flow guiding piece crossed by at least one bore, the bore opening close to a peripheral circumferential surface of the flywheel. The bore can be configured to send the cooling fluid flow to the flywheel along a direction of incidence which is perpendicular or oblique to the local radial direction in the area of impact of the cooling fluid flow line on the flywheel.

By "close to the peripheral circumferential" it is meant that the fluid flow touches the peripheral circumferential surface or at least one edge of that surface. The angle between the direction of incidence of the flow and the local radial direction of the flywheel may, for example, be estimated as a first approximation by plotting at least one line tangent to a guiding surface at the outlet of a bore in the guiding element, by taking the meeting point of this line with the flywheel, and by estimating the angle between the tangent line and the radial direction of the flywheel passing through the meeting point.

According to an embodiment, the bore is arranged in a direction substantially tangential to a peripheral circumferential surface of the flywheel. If the peripheral surface is smooth, it may be considered that the direction of the bore is substantially tangential if at least one line tangent to a guiding surface at the outlet of a bore is tangential to the flywheel peripheral surface. In an embodiment, the bore is substantially parallel to a radial plane of the flywheel, that is to say is parallel to the planes of the air gaps bordering the flywheel. More generally, one can consider that the direction of the bore is substantially tangential to the flywheel if at least one line tangent to a guiding surface at the outlet of a bore forms an angle between 45° and 90° relative to the radial direction of the flywheel at a point of the flywheel intercepted by the tangent line.

According to an embodiment, the flow guiding piece surrounds the flywheel. The flow guiding piece is crossed with several bores, angularly spaced around the piece and each opening close to the flywheel. According to a first embodiment, the bores are substantially centered in the middle of the axial width of the flywheel.

According to a second embodiment, at least one group of bores is substantially centered on an air gap, the air gap separating the flywheel and an axial stop associated with the flywheel. Associated with the flywheel means an axial stop positioned so as to be able to interact magnetically with the flywheel.

In an embodiment, the bearing system comprises a flywheel configured so as to magnetically interact with a first and with a second axial stop, placed respectively on either side of the flywheel. The flow guiding piece may then comprise two groups of bores, a first group of bores being substantially axially centered on the air gap between the flywheel and the first axial stop, and a second group of bores being substantially axially centered on the air gap between the flywheel and the second axial stop.

According to an embodiment, the magnetic bearing system comprises a cavity around the guiding piece, adapted to be supplied with gas under pressure, and into which are opening at least the radially outer ends of two of the bores of the flow guiding piece.

The peripheral circumferential surface of the flywheel may be smooth in the simplest case, or provided with reliefs, or provided with blades extending to the periphery of the flywheel in an axial direction. These reliefs or these blades form protuberances in a radial direction of the flywheel.

In some embodiments, the reliefs or blades may extend axially on just a portion of the axial thickness of the flywheel. In other embodiments, the reliefs or blades may extend axially over the entire axial thickness of the flywheel.

Alternative embodiments may also be considered in which the reliefs are provided on at least one radial face of the flywheel, the reliefs extending at least partly in a radial direction of the flywheel. These reliefs and/or blades arranged on the peripheral circumferential surface and/or arranged on the radial faces of the flywheel inside the air gap of the flywheel, are configured to facilitate the driving in rotation of the flywheel by the cooling fluid flow, especially if the local tangential speed of the fluid—i.e. the tangential speed of the fluid relative to the orthoradial direction of the flywheel—is greater than the rotational speed of the flywheel in contact with the fluid.

According to another aspect, the invention provides a method for cooling a magnetic bearing rotating flywheel arranged to rotate against a fixed axial stop, or arranged to rotate between two fixed axial stops, into which a cooling fluid flow is injected towards the flywheel in a direction of flow being in a substantially radial plane relative to the axis of rotation of the flywheel.

It may be possible to capture at least a portion of the cooling fluid flow, flowing in an air gap between the steering wheel and an axial stop, and sent it through a radial bearing so as to cool the radial bearing. The capture may be carried out, for example, by communicating a space of radial clearance between the flywheel and the stop, itself communicating with the air gap, and a space of radial clearance between a stationary portion and a rotatable portion of a radial magnetic bearing nearby. It is also possible to communicate the radial clearance between the flywheel and the stop and cooling channels going through a fixed portion of the radial magnetic bearing. Evacuation pipes of the cooling fluid are, of course, arranged outwardly of the radial magnetic bearing, on the axial side opposite the fluid inlet coming from the axial bearing so as to allow the circulation of the cooling fluid through the radial bearing. The radial magnetic bearing may be a magnetic bearing forming part of a same mechanical subset as the axial magnetic bearing. According to another alternative embodiment, the radial magnetic bearing may be a radial bearing located within distance of the axial magnetic bearing, that is to say a radial bearing separated from the axial bearing by a third rotating element, for example a radial bearing belonging to a compression stage of a rotating machine.

BRIEF DESCRIPTION OF THE DRAWINGS

Other purposes, features and advantages of embodiments of the invention will become apparent from the following description, given purely by way of non-limiting example and made with reference to the accompanying figures in which.

DETAILED DESCRIPTION

Figure 1:
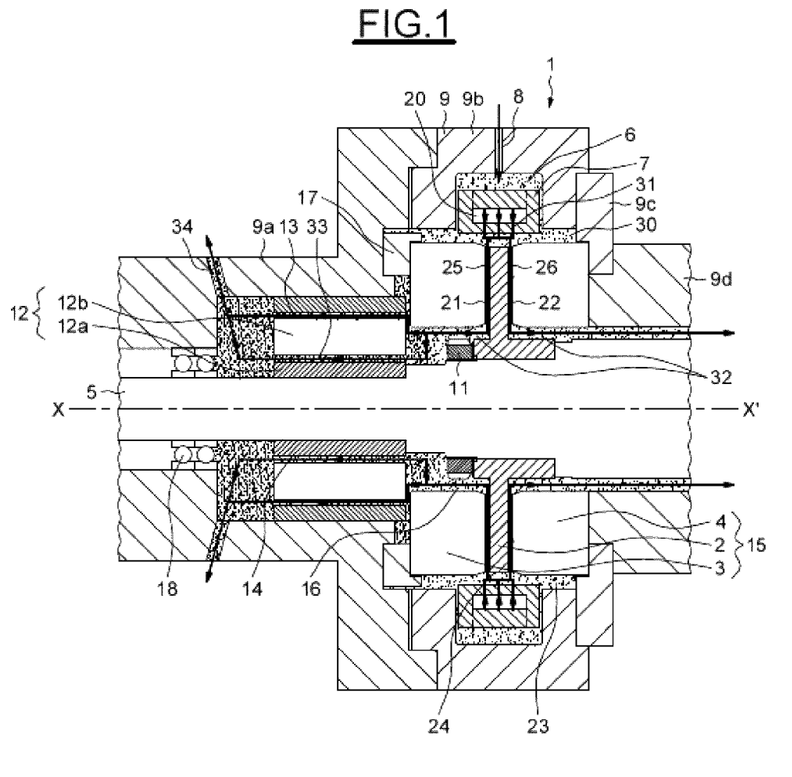
FIG. 1 is a schematic view in longitudinal section of a bearing system according to an embodiment of the invention.

As illustrated in FIG. 1, a system 1 of magnetic bearing for a rotating machine according to an embodiment of the invention is assembled on a shaft 5 having a geometric axis XX', comprises a rotating flywheel 2 assembled on the shaft 5, integral in rotation of the shaft 5 and held on the shaft 5 for example by means of a nut 11, comprises a first axial stop 3 and a second axial stop 4 integral with a housing 9 of the bearing system, the housing 9 being fixed. The system includes at least one zone 32 of central radial clearance defining a radial clearance between the shaft 5 or between a central portion of the flywheel 2 surrounding the shaft 5, and stator elements of the magnetic bearing system 1, for example a stop 3 or 4. These zones 32 allow a non-contact rotational movement between the shaft+flywheel assembly and the stator portions surrounding the shaft adjacent the flywheel. These zones 32 also allow, by means of gas lines leading into these zones, to evacuate the gases flowing in the air gaps 21 and 22.

The stops 3 and 4 are arranged in the immediate vicinity of the flywheel 2. The stops 3 and 4 are axially separated from the flywheel 2 respectively by a first air gap 21 and a second air gap 22.

The first stop 3 and the second stop 4 comprise electric windings for generating respectively a first and a second magnetic fields axially attracting the flywheel 2, respectively towards the first axial stop 3 and towards the second axial stop 4. The balance between both forces of attraction axially keeps the flywheel 3 and thus the shaft 5 in an axial position relative to the housing 9 of the magnetic bearing system.

The housing 9 is here made up of several housing parts 9a, 9b, 9c, 9d but could also be a one-piece housing or be composed of a different number of housing elements. In the example shown, one of the housing parts 9c and a reported axial wedge 17 respectively hold the second axial stop 4 and the first axial stop 3 in an axial position determined in relation with the housing 9.

The housing 9 is pierced by a fluid supply channel 8 which opens into a pressurizing space 6 surrounding the outer periphery of the flywheel 2. The pressurizing space 6 is separated radially by a flow guiding piece 7 from a space 23 in the immediate environment of the flywheel, or radial interval between the flywheel and the flow guiding piece 7. The space 23 in the immediate environment of the flywheel defines a volume of gas in which the outer circumference of the flywheel 9 is immersed. In the example shown, at least part of the outer circumferences of the first axial stop 3 and the second axial stop 4 is also immersed in this volume.

This space of immediate environment 23 also communicates with the first air gap 21 and the second air gap 22.

The flow guiding piece 7 channels the fluid present in the pressurizing space 6 to enable the fluid to flow to the space 23 through one or more bores 20 of the flow guiding piece. The bores 20 direct the fluid flow coming from the pressurizing space 6 to the flywheel 2, following a centripetal direction substantially located in a radial plane. Axial direction means in the description a direction parallel to the axis of rotation XX' of the machine. Radial direction means a direction perpendicular to the axis XX' and passing through this axis XX'. The flow 31 of cooling fluid is represented here by black arrows. This flow 31 passes through the fluid supply channel 8 then the fluid guiding piece 7 through the one or more bores 20, and impacts the flywheel 2, on the one hand on a peripheral circumferential surface 24 of the flywheel, and, on the other hand, at the radial surfaces 25 and 26 of the flywheel. The radial surfaces 25 and 26 of the flywheel axially limit respectively the first air gap 21 and the second air gap 22. Alternative embodiments may be considered in which the cooling flow reaches the flywheel in a direction within a radial plane, impacting either only the peripheral circumferential surface 24, or only one or two radial surfaces 25, 26 of the flywheel. In the latter case, the cooling fluid flow is directed so as to impact with a comparable flow rate each of the two radial surfaces in order to avoid as much as possible changing the axial balance of the flywheel.

Whatever the impact surface on the flywheel 2, the cooling fluid flow 31 flows along the radial surfaces 25 and 26 of the flywheel 2 until it reaches the zones 32 of central radial clearance. From the zones 32 of central radial clearance, the cooling fluid may be channeled to be supplied to other bodies to be cooled.

In the example shown, the fluid flow flowing over one of the radial surfaces of the flywheel 2, here the fluid flowing on the left side, that is to say on the surface 25 of the flywheel, is then directed through a radial magnetic bearing 12 pertaining to the same rotating machine as the axial magnetic bearing 1, in order to cool the radial magnetic bearing. The rotating machine may be a turbine or a compressor handling a gas or a fluid. The cooling fluid may be supplied from the axial bearing 1 to a radial bearing pertaining to the same stage of compression or relaxation as the axial bearing 1, or may be sent to another stage of the rotating machine. As the cooling fluid flow is sent, as described below, on at least one surface of the flywheel with at least one non-zero tangential velocity component at the surface, and further, according to an embodiment, as the relative tangential speed of the fluid relative to the surface is less than the absolute speed, in a fixed reference mark linked to the housing 9, the pressure losses of the cooling fluid in contact with the flywheel 2 are lower than in conventional embodiments where the fluid is sent on one of the radial surfaces of the flywheel, in a substantially axial direction. In addition, the cooling fluid heats up less than in a conventional embodiment with comparable flow rate. This lower pressure drop and lower heating allow reusing the cooling fluid more effectively to cool other bodies after cooling the flywheel 2.

In the example shown, from the radial clearance zone 32 of the axial bearing, a portion of the cooling fluid is directed in a radial clearance 33 provided between the rotating portion 12a and the stator part 12b of the radial bearing 12, and a portion of the fluid is directed through one or several cooling channels 13 which cross the stator part of the radial bearing 12 in the same axial direction. These channels 13 are drilled only over a limited angular portion around the axis XX', and do not form radial clearance extending around the axis XX'. The fluid having passed through the radial bearing 12 may then be extracted from the magnetic bearing system 1 through an orifice 34 of fluid discharge, passing through the housing 9. The bearing system may optionally also comprise a radial ball bearing 18 to maintain a mobility of the shaft 5 relative to the stator housing 9 during the phases in which the radial magnetic bearing 12 is deactivated.

As the fluid flow 31 arrives on the flywheel 2 of the axial bearing in a direction which is substantially radial, the fluid friction effect at the level of the air gaps 21 and 22 is reduced. Furthermore, if the direction of the fluid arrival through the bores 20 is configured to be directed obliquely with respect to the local normal line to the peripheral circumferential surface 24 of the flywheel, the pressure of the cooling fluid flow 31 can then contribute to the rotation of the flywheel 2, instead of generating fluid frictional forces which would tend on the contrary to slow down the flywheel 2 and to generate additional calories by fluid friction.

It therefore may be beneficial that in at least some of the cooling fluid impact points on the flywheel 2, the orthoradial speed of the cooling fluid be greater than or equal to the local linear speed of the point on the steering wheel 2 impacted by the cooling fluid.

The points concerned by this speed ratio may be either points located on the peripheral circumferential surface 24 of the flywheel, or points located on the first radial surface 25 or located on the second radial surface 26 of the flywheel.

Figure 2:
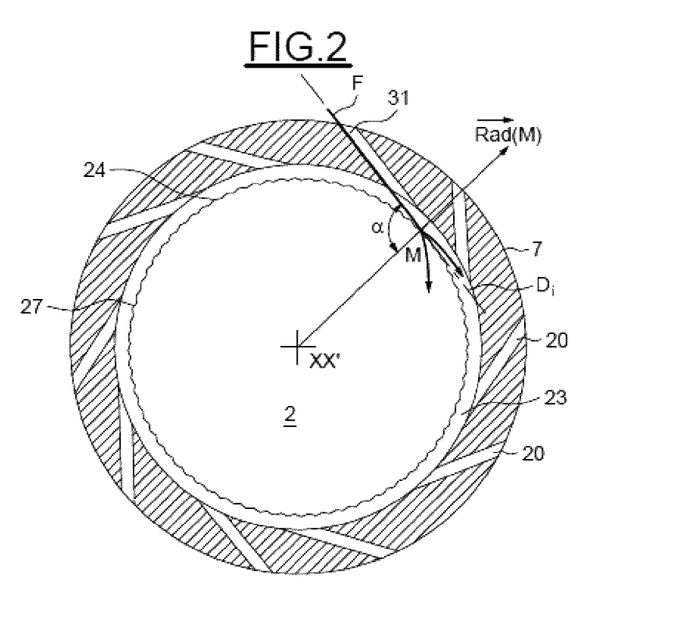
FIG. 2 is a simplified cross sectional view of a subset belonging to a bearing according to an embodiment of the invention.

FIG. 2 illustrates, in a simplified manner, a section, in a radial plane, of a flow guiding piece 7 according to an embodiment of the invention and a flywheel 2 according to an embodiment of the invention. There are common elements in FIG. 1 and FIG. 2, the same elements being designated by the same references. The boundary between the flywheel 2 and the shaft 5 is not shown in this figure.

The flow guiding piece 7 is here punched with several bores 20 each extending symmetrically on either side of an average radial plane corresponding, for example, to the plane of the figure. Each bore 20 forms a substantially straight channel, the channel direction corresponding substantially to the incidence direction, denoted F, of the cooling fluid flow exiting the channel in the direction of the flywheel 2. The direction F is here substantially tangent to the peripheral circumferential surface 24 of the flywheel. Thus, the speed of the cooling fluid, impacting the flywheel 2, can contribute effectively to transmit a torque to the flywheel 2. It is assumed, in the example illustrated in FIG. 2, that the usual direction of rotation of the flywheel 2 is clockwise. It is possible to define an angle of incidence a of the cooling flow at a point M of the flywheel 2 as the angle between the direction of arrival F of the flow on the flywheel, and a radial direction $\vec{R}ad$ (M) passing through the point M and the axis XX'. The cooling fluid flow arriving through the bores 20 can flow, on the one hand and in a first step, around the peripheral circumferential surface 24 of the flywheel and, on the other hand, directly or in a second step, along the radial surfaces 25 and 26 of the flywheel in the direction of the axis XX', as shown in FIG. 2 by the splitting of the arrow 31 at the impact point M on the flywheel.

As illustrated in FIG. 2, the peripheral circumferential surface 24 of the flywheel may present reliefs, rough spots or ridges 27 enhancing the effect of driving the flywheel in rotation under the effect of the thrust of the cooling fluid flow arriving on the wheel with a tangential speed component. Such reliefs, rough spots or ridges may also be arranged on the first radial surface 25 and the second radial surface 26 of the flywheel 2, or be arranged only on the radial surfaces of the flywheel 2. Reliefs on the peripheral circumferential surface 24 are however easier to form so as to only slightly disturb the magnetic field lines in the flywheel, than the reliefs formed on the radial surfaces 25 or 26 of the flywheel.

In the example shown, the bores 20 leading the fluid flow in the direction of the flywheel 2 are angularly distributed evenly around the flywheel 2. Alternative embodiments may be considered in which the bores 20 are distributed so that the distance between two successive holes forms a pattern obtained by angular offset from a base pattern, without all the bores being at the same distance from each other. According to an alternative embodiment, the bores 20 may not even be evenly distributed around the axis XX'. In an alternative embodiment, it could be possible to bring the cooling fluid flow through a single bore or by only one group of bores, all located at substantially the same angular position with respect to the flow guiding piece 7.

Figure 3:
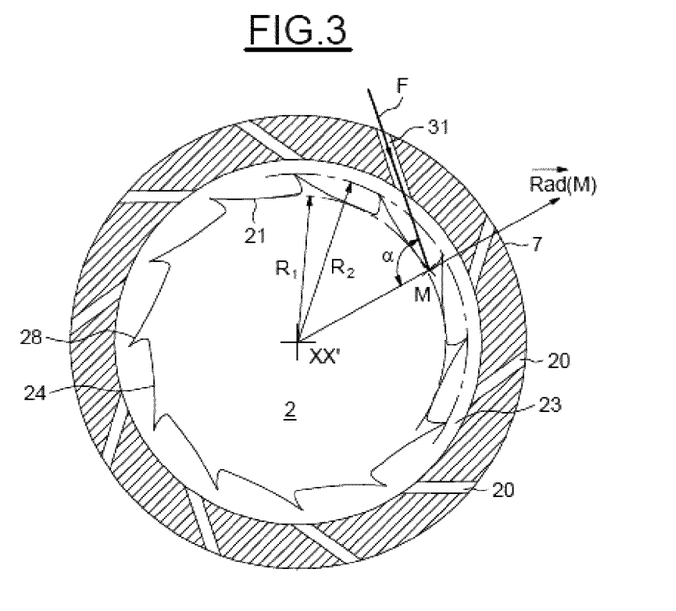
FIG. 3 is a simplified cross-sectional view of a subset belonging to another bearing according to an embodiment of the invention.

FIG. 3 illustrates in a simplified manner a section in a radial plane, of another flow guiding piece 7 according to an embodiment of the invention and of another flywheel 2 according to an embodiment of the invention.

There are common elements in FIG. 3 and the previous figures, the same elements being designated by the same references.

In the example illustrated in FIG. 3, the peripheral surface 24 of the flywheel 2 comprises circumferential blades 28 extending radially between a minimum circumferential radius $R_1$ of the flywheel 2 and a maximum circumferential radius $R_2$ of the flywheel 2. The blades 28 have a geometry configured to improve the driving in rotation of the flywheel 2 by a cooling fluid flow passing through the bores 20, and impacting the peripheral circumferential surface 24 of the flywheel in a direction F. If one takes into account a point M as the impact point of the cooling fluid flow on the steering wheel 2, the angle α between the direction of impact F and the local radial direction $\vec{R}ad$ (M), is here greater than 90°, that is to say that the impact direction F of the flow is not just tangent to the average contour of the flywheel, but that direction F "points" towards the center of the flywheel 2, which facilitates the flow of cooling fluid along the radial surfaces of the flywheel in the first and second air gaps 21 and 22 (not shown in FIG. 3), and in the discharge direction of the cooling fluid. In the embodiment of FIG. 2, the value of the angle α is close to 90°, thereby improving the driving in rotation effect of the flywheel.

One can thus distinguish two embodiments, each with its advantages considering the geometries associated to the guiding piece 7 and the flywheel 2. In a first alternative embodiment, the direction of the bores 20 is such that the direction of fluid flow F is tangent to a circle of axis XX' whose radius is comprised between a circumferential minimum radius $R_1$ and a maximum circumferential radius $R_2$ of the flywheel 2. The driving effect by the fluid flow is then maximized for the fluid flowing around the peripheral circumferential surface 24 of the flywheel.

Figure 4:
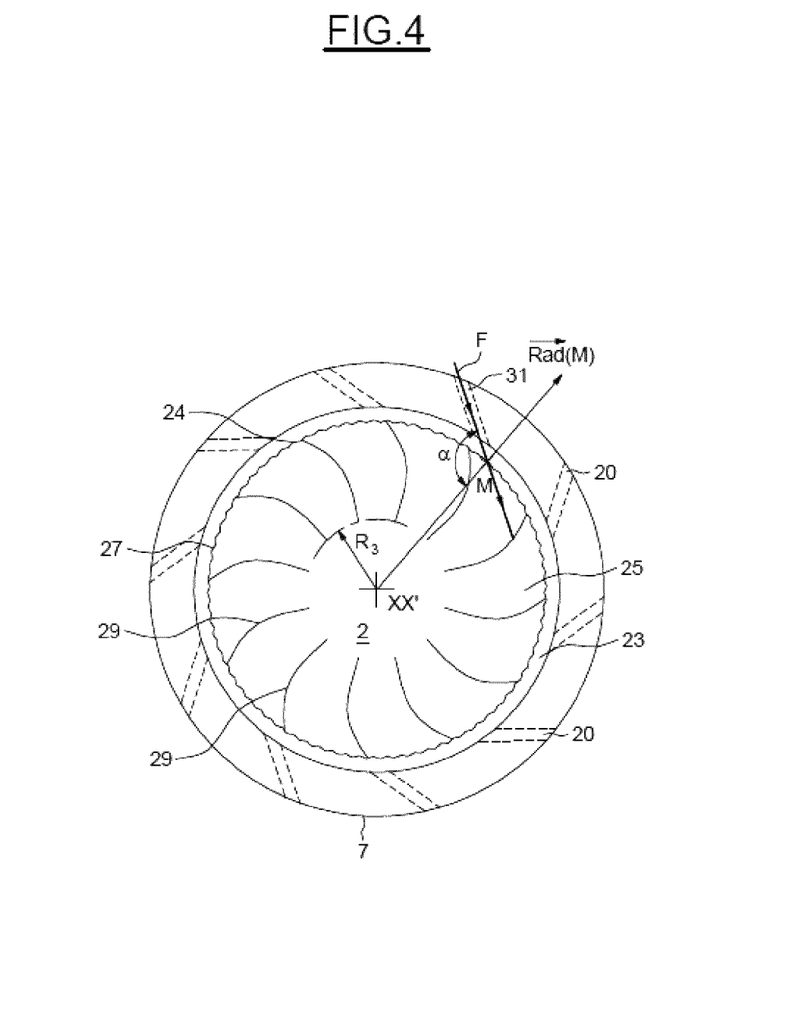
FIG. 4 is a simplified cross-sectional view of still another bearing according to an embodiment of the invention.

In another embodiment, the direction of the bores 20 is such that a circle of axis XX' tangent to the flow direction F has a radius lesser than the minimum radius $R_1$ of the peripheral circumferential surface 24 of the flywheel. This second alternative embodiment facilitates the flow in the air gaps 21 and 22 axially bordering the flywheel 2, and facilitates, where appropriate, the driving in rotation of the flywheel by the fluid friction of the cooling fluid over the radial surfaces 24 and 25 of the flywheel. FIGS. 3 and 4 are illustrations of such a second embodiment.

FIG. 4 illustrates in a simplified manner a third flow guide piece 7 according to an embodiment of the invention and an associated flywheel 2. In the example of FIG. 4, the fly wheel 2 is shown in front view at its first radial surface 25. The radial surface 25 is provided with lateral blades 29 facilitating the driving in rotation of the flywheel 2 by a portion of the cooling fluid flow flowing through the first air gap 21. Such blades 29 may, for example, be defined by a light rib-shaped relief extending between the outer circumference of the flywheel 2 and an inner boundary of radius $R_3$ on the radial surface of the flywheel. The axial thickness of these blades remains moderate so as not to disturb, to the extent possible, the magnetic interactions between the flywheel 2 and the axial stops 3 and 4 (not shown in FIG. 4).

Figure 5:
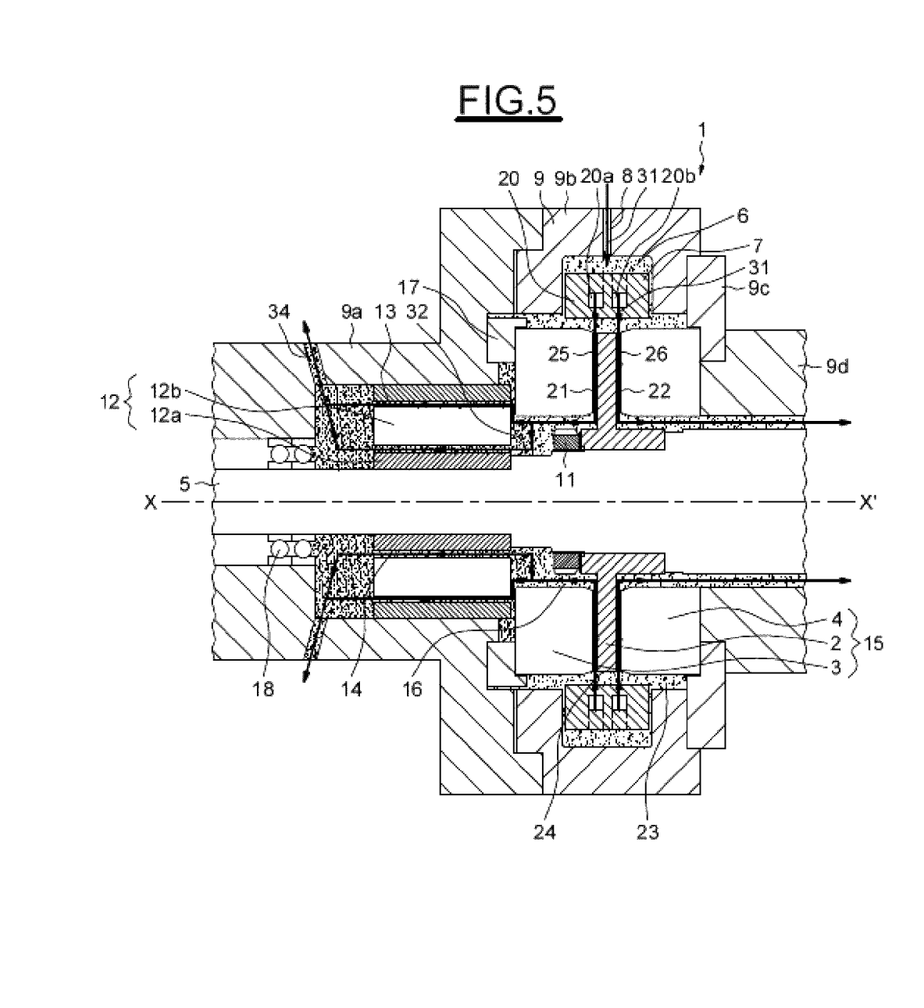
FIG. 5 is a simplified view in longitudinal section of a bearing variant according to an embodiment of the invention.

In order to favor a cooling of the flywheel 2 by its radial faces 25 and 26, it is possible to provide, instead of a single bore 20 at each angular position of the bore, two parallel bores 20A and 20B as shown in FIG. 5, each of the bores 20A and 20B opening substantially facing respectively the first air gap 21 and the second air gap 22.

FIG. 5 shows such embodiment in a simplified view, in axial section. There are in FIG. 5 common elements to the previous figures, the same elements being designated by the same references. Two parallel bores 20a and 20b as shown in FIG. 5, or a series of two bores 20a and 20b spaced angularly about the axis XX', substantially open respectively facing the first air gap 21 and the second air gap 22. In the example illustrated in FIG. 5, the axial width (i.e. along the axis XX') of each of bores 20a and 20b is less than the axial distance between the first axial stop 3 and the second axial stop. In other words, the axial width of each of the bores 20a and 20b is less than the axial thickness of the flywheel 2. Each of the bores 20a and 20b is substantially centered, respectively on the first air gap 21 and the second air gap 22. It is possible to consider variant embodiment in which the bores 20a and 20b are not strictly centered on the air gaps, but the two bores 20a and 20b are arranged symmetrically relative to a radial median plane separating the two air gaps 21 and 22, and two holes 20a and 20b are each disposed at least partly opposite one of the air gaps.

Thanks to the cooling fluid circulation system according to an embodiment of the invention, temperature rises caused by fluid friction of the cooling fluid at the flywheel 2 and the axial stops 3 and 4 are reduced. The number of calories to be removed being thus reduced, the cooling fluid flow rate necessary to ensure a given temperature of the magnetic bearing system is also reduced. In some cases, the act of going from a conventional configuration where the cooling fluid injection is done in an axial direction, to the configuration according to an embodiment of the invention where the injection is done in a radial plane, allows to halve the thermal power to evacuate at the axial bearing.

The gas or the cooling fluid injected at the fluid supply channel 8, such as a cold fluid, for example a gas with a temperature of between 10° C. and 50° C. For typical applications of the axial bearing, for example the axial bearing of a compressor, the pressure of cooling fluid at the pressurizing space 6, surrounding the flow guiding piece 7, may be of the order of 2 to 3 bar. A cooling fluid pressure, for example between 1 and 2 bar, and a fluid flow speed of, for example, between 150 and 350 m/sec, can then be obtained at the outlet of bores 20, in the space 23 defined outside the flow guiding piece 7 and bathing the flywheel 2.

In an embodiment, the thickness of the air gaps is configured so that the cooling fluid pressure reaching the vicinity of the shaft 5 is still greater than 1 bar, for example at least greater than 1.2 bar. This overpressure relative to the atmospheric pressure can either allow the cooling fluid to drain spontaneously outwardly of the housing, or to use this fluid for cooling other elements of the bearing system or other elements of an assembly incorporating the bearing system.

The disclosure is not limited to the exemplary embodiments described and may be broken down into many variations. The injection channels, described above as bores, may not be rectilinear, and could be achieved by other techniques that boring by machining, for example could be made in the foundry.

The peripheral circumferential surface 24 of the flywheel may include reliefs or blades monoblock with the flywheel, or may include added elements to improve the 'wind surface' of the peripheral surface of the flywheel. This circumferential surface may also be smooth. It is conceivable to use alternative embodiments in which the flow of gas or cooling fluid is brought on the flywheel in a substantially radial direction, this arrival direction of the fluid not being strictly radial but, for example, comprised within an angle between 0 and 15° relative to the radial direction. If this alternative embodiment does little to drive the wheel into rotation, it allows at least reducing fluid friction between the cooling fluid and the flywheel.

The magnetic bearing system according to an embodiment of the invention may comprise only one axial stop associated with the flywheel, for example, in the case of systems with vertical rotation axis. The magnetic bearing system according to an embodiment of the invention may be beneficial for systems such as pumps, turbines, and compressors, which are already originally cooled by a circulating fluid. The magnetic bearing system according to an embodiment of the invention could be applied to any magnetic system for maintaining a determined axial position of a rotational axis of any mechanical system. The cooling fluid circuit may be dedicated only for the cooling of an axial bearing flywheel, and of one or more associated stops, without the fluid being then recovered for cooling other elements of the bearing or of the associated mechanical system.

Two groups of injection channels 20, used alternately depending on the direction of rotation, may be envisaged for systems designed to operate indifferently in one or the other direction of rotation about the axis XX', each of the groups of injection channels having an angle of flow incidence opposite from the flywheel 2. It is also possible to consider bores or injection channels 20 arranged in a radial direction of the flywheel.

It is to be understood that even though numerous characteristics and advantages of various embodiments have been set forth in the foregoing description, together with details of the structure and functions of various embodiments, this disclosure is illustrative only, and changes may be made in detail, especially in matters of structure and arrangement of parts within the principles of the embodiments to the full extent indicated by the broad general meaning of the terms in which the appended claims are expressed. It will be appreciated by those skilled in the art that the teachings disclosed herein can be applied to other systems without departing from the scope and spirit of the application.

What is claimed is:

1. A magnetic bearing system, the system comprising:
an axial bearing rotatable flywheel;
a cooling fluid path configured to send a flow to the flywheel in a direction of the flow being in a substantially radial plane relative to the axis (XX') of rotation of the flywheel; and
at least one fluid flow guiding piece traversed by at least one bore, wherein the bore opening is close to a peripheral circumferential surface of the flywheel, and the bore is configured to send the flow on the flywheel along a direction of an incidence which is perpendicular or oblique to the local radial direction (Rad M)) of the flywheel,
wherein the flywheel is configured to interact magnetically with a first axial stop and with a second axial stop placed respectively on either side of the flywheel, wherein the flow guiding piece comprises a first group of bores substantially centered axially on an air gap between the flywheel and the first axial stop, and a second group of bores substantially centered axially on an air gap between the flywheel and the second axial stop.

2. The system according to claim 1, wherein the fluid flow guiding piece surrounds the flywheel, the flux guiding piece is traversed by several bores angularly distributed around the piece, each opening being in a vicinity of the flywheel and following substantially the same angle of incidence relative to the flywheel.

3. The system according to claim 1, wherein the bores are substantially centered in a middle of an axial width of the flywheel.

4. The system according to claim 1, wherein the peripheral circumferential surface of the flywheel is provided with reliefs or blades extending in the axial direction (XX') of the flywheel.

5. The system according to claim 2, wherein the bores are substantially centered in the middle of the axial width of the flywheel.

6. The system according to claim 2, wherein at least one group of bores are substantially centered on an air gap between the flywheel and an axial stop associated with the flywheel.

7. The system according to claim 3, wherein at least one group of bores are substantially centered on an air gap between the flywheel and an axial stop associated with the flywheel.

8. A method of cooling a magnetic bearing rotating flywheel, the method comprising:
injecting a cooling fluid flow towards the flywheel in a direction of a flow, wherein the direction of the flow is in a substantially radial plane relative to an axis of rotation (XX') of the flywheel, wherein the magnetic bearing rotating flywheel is arranged for rotation against a fixed axial stop or between two fixed again stops; and
sending the cooling flow on the flywheel so that, in at least one point of impact (M) of the flow on the flywheel, a speed component of the flow, which is perpendicular to a radial direction ((M)), is greater than or equal to half a linear speed of a flywheel rotation at this point of impact (M),
wherein in at least one point of impact (M) of the flow on the flywheel, a speed component of the flow, which is perpendicular to the radial direction ((M)), is above or equal to 0.7 times a linear speed of rotation of the flywheel at this point of impact.

9. The method according to claim 8, further comprising capturing at least a portion of a cooling fluid, flowing in an air gap between the flywheel and an axial stop and sending it through a radial bearing so as to cool the radial bearing.

10. The method according to claim 8, further comprising capturing at least a portion of a cooling fluid, flowing in an air gap between the flywheel and an axial stop and sending it through a radial bearing so as to cool the radial bearing.

* * * * *